Aug. 18, 1959    R. S. CAVINESS    2,899,706
MOLDING PLASTIC ARTICLES
Filed July 26, 1955    2 Sheets-Sheet 1

Aug. 18, 1959   R. S. CAVINESS   2,899,706
MOLDING PLASTIC ARTICLES
Filed July 26, 1955   2 Sheets-Sheet 2

United States Patent Office 2,899,706
Patented Aug. 18, 1959

2,899,706

MOLDING PLASTIC ARTICLES

Robert S. Caviness, Bethesda, Md.

Application July 26, 1955, Serial No. 524,517

3 Claims. (Cl. 18—19)

This invention includes three improvements in molding articles of plastic. They are especially pertinent to the molding of reinforced or laminated thermosetting plastics, but are also useful in molding any plastic material requiring the simultaneous application of heat and pressure.

First, this invention provides an inexpensive apparatus by which a molder of plastics can obtain a thoroughly compacted product, of uniform thickness, which is smooth on both sides. At present the only means employed in the industry which is capable of producing a dense, air-free, uniform product having two "good" sides is by using expensive presses and equally expensive metal dies.

Second, this invention makes possible and/or practicable the integral or one-piece die molding of large, oddly-shaped articles which required die pressures in more than one direction simultaneously. As an example, the bench used to illustrate this invention requires pressure from several directions because each leg extends at a different angle from the bottom. It might be theoretically possible to devise a compound or split press die by which a similar result could be achieved, but the cost would be prohibitive.

Third, this invention includes an apparatus by which accurately shaped cores can be molded between thin skins of plastic, making it possible to increase the gross thickness and the strength of sections without increasing the weight and cost of plastic materials. Such method permits the application of pressure and heat within the core equal to the pressure and heat being applied simultaneously to the exterior of the dies, thus assuring the molder of thoroughly compacted skins and bridging members connecting the skins. Present coring practice requires the use of lightweight filler material such as balsa, plastic foam or honeycomb. The apparatus here described will eliminate the principal problem inherent in present practice, i.e., how to apply sufficient pressure to eliminate air bubbles and obtain a highly compacted skin without crushing the filler or core material.

In general, my invention involves the use of accurately matched dies constructed of relatively inexpensive materials such as plaster, plastics, sheet metal, or sprayed metal; the gasketing and venting of those dies in such a way that, when subjected to fluid pressure within a pressure chamber, an effective uniform pressure is applied to all external surfaces of the material being molded equal to the difference between the pressure within the pressure chamber and the atmosphere (or a vacuum if the molder wishes); the use of split or compound dies of the type just described by the method just described to obtain die pressures from several directions simultaneously; and the provision of accurate and reliable cores by the use of envelopes sealed from the material being molded but vented into the pressure chamber.

The objects and advantages of my invention will be apparent from the following description read in conjunction with the accompanying drawings in which:

Figure 1 is a perspective view of a bench produced by the methods described in my invention.

Figure 2 is a section through a pressure chamber showing a side elevation of the male die 1, female die 13 and leg dies 6, assembled and closed under pressure, with vent lines connected.

Figure 3 is a perspective cutaway view of the male die 1 showing a layup of reinforced thermosetting plastic ready for application of the female die 13 and leg dies 6—except that the core venting needles 8 shown in the legs would not be inserted until the female die 13 has been placed in position.

Figure 1:
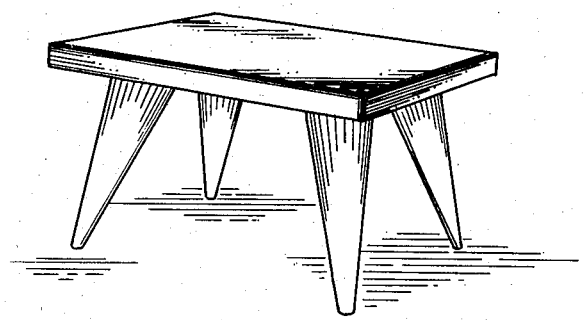
Figure 2:
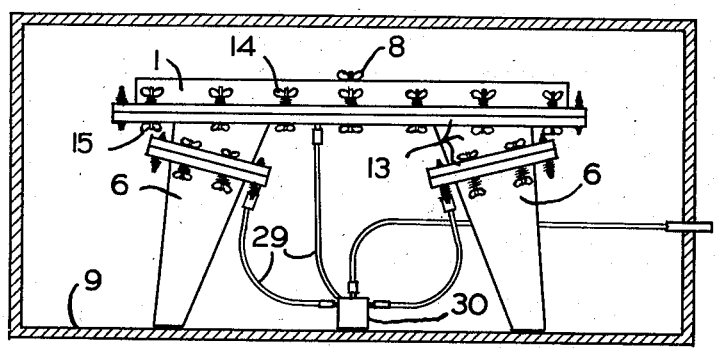

Referring to the drawings for a more detailed description, it should be understood that a bench has been used for illustration in order to show clearly the several objects of my invention. All or some of the methods forming parts of my invention can be employed in molding any article which can be made from thermoplastic or thermosetting materials ranging from thin flat sheets without cores to large pieces of furniture to boat hulls.

The dies 1, 13 and 6 are made most quickly and cheaply by casting them upon a prototype of the article to be produced. The most practical material for the dies appears to be a suitably heat-resistant synthetic resin reinforced with fiber glass, although many other materials can be used. Either contact or bag casting can be employed, the former being less difficult and adequate in most cases. Rigid reinforcement may be necessary to prevent distortion of thin dies resulting from variations in strain and stress in curved or dished areas. Usually such distortions in plastic dies can be cured by laminating suitably shaped rigid electric conduit into one or both dies. In plastic dies a heat-conducting filler should be used in the resin to expedite the passage of heat through the dies to the material being molded. Or, if rapid curing is required, metal tubing can be wound and laminated into each die to form a steam jacket for direct connection to a steam line.

First determine upon a parting line between the two or more dies. Using clay or plaster construct a flange or dyke along the main parting line shaped to permit the casting of a flange 2 about 1½ to 2 inches wide. Cast and cure the first die 1. Without removing the first die turn the prototype over and remove the clay or plaster dyke. If compound dies are required build additional clay or plaster dykes on the secondary parting lines. Cast the second die 13, using the flange 2 of the first die as a mold for the adjacent flange of the second die, and so on.

After all dies have been cured and before they are separated, drill holes 3 through the flanges 2, spaced close enough to assure realignment of the dies and a reasonably firm seal against the gasket 19. Separate the dies 1, 13 and 6. Mill shallow troughs 18 for the gasket 19, just deep enough to permit the shoulders of the flange to close tightly, when the mold is empty and the gasket in place, upon being subjected to one-fourth to one-eighth of the maximum molding pressure, depending upon the lateral resistance of the gasket material in relation to its vertical resistance. Depth and width of the troughs 18 and dimensions and density of the gasket 19 should be gauged to provide a complete seal against the maximum molding pressure when a gap of about ⅛ inch exists between the flanges 2, with the molding material in place.

Drill holes for bleeder tube nozzles 4 in shoulder of flanges 2. Quantity and spacing will depend upon the size and shape of the product. Countersink lip of bleeder tube nozzles 4 flush or below flange surface 2. Tighten with nut 22 against fiber or gasket type washer 21 to withstand maximum molding pressure.

For products without cores, apply material to be molded, hand-fasten dies, and apply pressure. If quantity of material cannot be determined accurately enough to avoid excessive flash, it may be helpful to countersink the bleeder tube nozzles 4 below the surface of the flanges 2 and mill a suitable notch or sprue from the nozzles 4 to the mold cavity. On dies intended for production runs, flash cutoff blades of hardened steel (for example, used band saw blades) can be cast into the dies with an appropriate cavity between the blades and the gasket to hold the material cut off.

For products with cores, such as the bench illustrated in the drawings, lay up the first layer of material to be molded 10 in the die 1. Fold core envelopes 11 of ductile aluminum foil, heavy cellophane, or other material impervious to the pressure medium. Lap all joints 31 in envelopes 11 at least 2½ inches and coat both surfaces of lap with an adhesive to full width of lap. End joints should be folded back 3 to 6 inches and all contacting surfaces of the fold coated with adhesive. The adhesive used should be of such consistency that it will hold the lap or fold together until the layup is completed and while being subjected to pressure, but will not fully set or cure at the maximum molding heat and pressure. In laying up, the core envelopes should be constructed slightly smaller in cross-section than their intended final shape, so they will expand by pulling against the adhesive when pressure is admitted to them, to provide a reasonably wrinkle-free surface and an even pressure against the surrounding material being molded.

Figure 6:
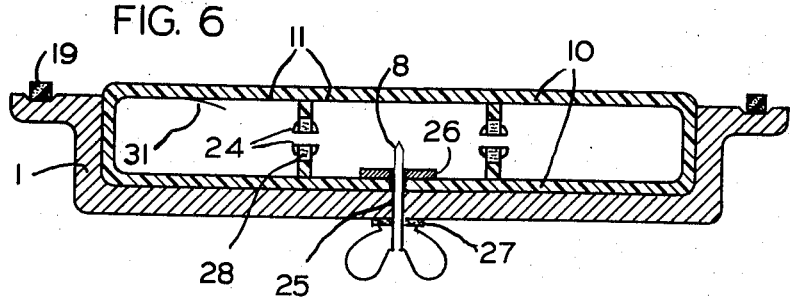
Figure 6 is a central vertical section through the male die, not to scale, showing a method of venting core envelopes to the pressure chamber.

Each core envelope 11 must be vented to the pressure chamber. There are several ways this can be done, one of which is illustrated in Figure 6. A hole 25 is drilled through one of the dies 1. If possible the venting needle should be inserted so that the resultant hole will be on the bottom, but the hole will be small and can be patched after molding. A wide, washer-like nut 26, is placed opposite the hole 25 on the inside of the core envelope 11. A hollow needle shaped similar to that shown as 8 is pushed through the plastic material 10, through the envelopes 11 and tightened against a fiber or gasket-type washer 27 to withstand maximum molding pressure from both sides. The side of the nut 26 toward the die 1 should be coated with adhesive so it will not become loose within the core 11 after the needle is withdrawn.

Strength of the product can be increased by bridging in high load areas. This can be done with pre-formed inserts, or by partially inflating the core envelopes 11 with air and inserting molding material containing a stiffener such as crinoline or mesh before applying the top layer of the molding material 10. Whatever the bridging material, hollow rivets or brads with wide flanges 24 should be used to connect the envelopes 11 tightly if only one venting needle 8 is used. Separate venting needles 8 can be used in each core envelope 11 if desired. If rivets or brads 24 are used, a fiber or similar ring or washer 28 should be employed to seat the rivets against the core envelope material 11 to obtain a high strength seal, and the edges of the rivet lip must be prevented from cutting the envelope material 11.

After the top or second layer of molding material 10 has been applied, the leg layups 12 are put in place, and that part to be covered by the female die 13 is coated with resin. Laps in the leg core envelopes 7 above the female die are not coated with adhesive at this stage. The female die 13 is applied. The molder reaches inside each core envelope with hand or instrument and affixes a nut 26 to a core venting needle 8 through holes drilled in the female die 13, in the way previously described.

Figure 3:
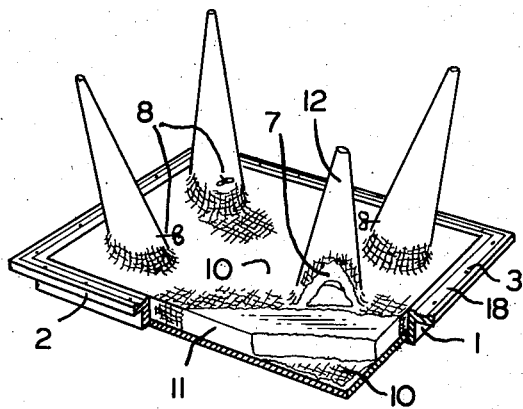
Figure 4:
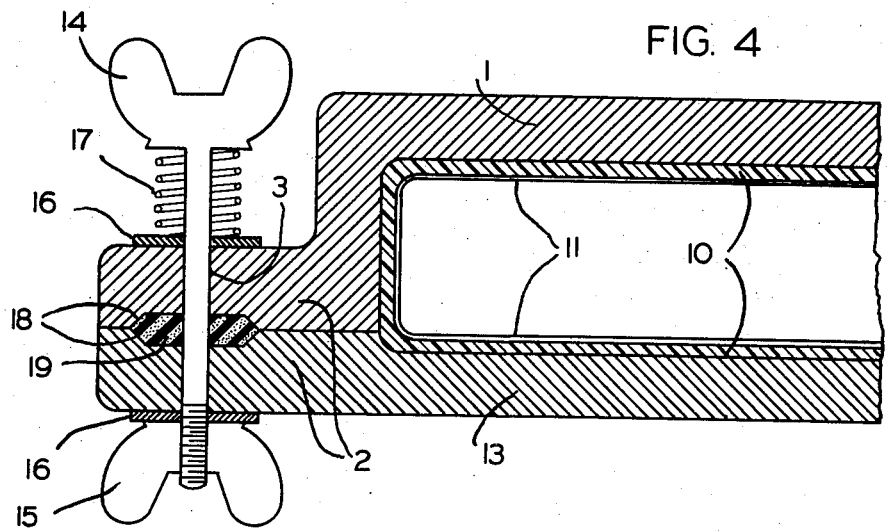
Figure 4 is a section of the edge of the closed dies, showing a method of flanging, gasketing and fastening.
Figure 5:
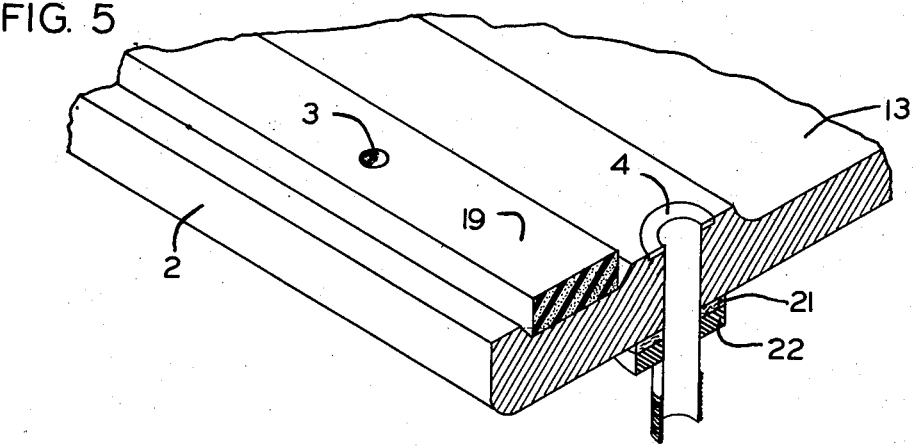
Figure 5 is a section of the edge of the female die, showing a method of venting the interior of the dies to atmosphere or a vacuum.

By using leg dies 6 split vertically, legs of almost any shape can be obtained. But, in this illustration, leg layups 12 are formed of cone shaped core envelopes 7 covered by plastic material 12 as shown in Figure 3. Leg layups should be designed so additional layers of reinforcement can be blended in around the juncture with the bench, at the point of maximum strain. Core envelopes for the legs 7 should be made of material satisfying the requirements previously stated, but also having sufficient stability to support the molding material without slumping.

Adhesive is applied to the remainder of the laps in the leg core envelopes 7. Resin is applied to the remainder of the leg layups 12, and the leg dies are applied. All dies are closed, wing screws 14 and nuts 15 are hand tightened against a strong spring 17, all being seated on washers 16, to provide a seal against the gasket 19 sufficient to withhold at least 10 pounds pressure above atmosphere. Wing screws are illustrated for simplicity, but quick closing devices providing equivalent spring tension are preferable.

The assembly is placed in a pressure chamber 9. Pressure can be provided by air, steam or a liquid. Direct steam will avoid the necessity for and expense of heating the pressure medium separately. Bleeder lines 29 with cups to catch excess resin 30 are connected to the bleeder tube nozzles 4. Bleeder lines can be vented to atmosphere or to a vacuum. Properly designed, this method will operate satisfactorily at pressures of 200 or more p.s.i. and at temperatures limited only by the heat distortion point of the material of which the dies are constructed.

I claim:

1. Apparatus for molding articles of plastic material comprising a pressure chamber for fluid under pressure, a mold including a pair of mating hollow self-supporting dies subject to deformation under the influence of non-uniformly applied molding pressures forming a mold chamber within said pressure chamber, adjacent parallel flanges projecting outwardly from said dies, aligned circumferential recesses in the abutting surfaces of said flanges, flexible sealing means in said recesses, means for drawing said dies together upon said sealing means to tightly seal the interior of said dies from said pressure chamber with said flanges in spaced relation, means for introducing fluid under substantial pressure in said chamber to close said dies and bring said flanges into molding engagement by the substantially uniform pressure of said fluid over the entire outer surface of said mating dies and at least one bleeder tube extending through one of said flanges and opening into the interior of said dies at a point between said sealing means and said mold chamber, said bleeder tube extending to a point having pressure less than the fluid pressure in said pressure chamber.

2. Apparatus as defined in claim 1 in which said mold includes at least three mating dies and at least one of said flanges includes a cavity between the interior of said dies and said sealing means for receiving flash from said dies.

3. Apparatus as defined in claim 1 including an inflatable, flexible bag within said dies for pressing plastic material against the inner surfaces thereof, a vent extending through one of said dies and into said flexible bag, said vent having its outer end communicating with said pressure chamber to supply fluid under pressure from said pressure chamber to the interior of said flexible bag.

References Cited in the file of this patent

UNITED STATES PATENTS

| | | |
|---|---|---|
| 1,109,048 | Dees | Sept. 1, 1914 |
| 1,142,341 | McNeil | June 8, 1915 |
| 1,310,437 | Roberts | July 22, 1919 |
| 2,031,418 | Kraft | Feb. 18, 1936 |
| 2,041,357 | Kraft | May 19, 1936 |
| 2,301,125 | Kramp et al. | Nov. 3, 1942 |
| 2,329,425 | Steel | Sept. 14, 1943 |
| 2,460,820 | Hagopian | Feb. 8, 1949 |
| 2,531,218 | Johnson | Nov. 21, 1950 |
| 2,587,413 | Vander Heyden | Feb. 26, 1952 |
| 2,671,244 | Freedlander | Mar. 9, 1954 |